(12) United States Patent
Grauerholz

(10) Patent No.: US 8,489,255 B2
(45) Date of Patent: Jul. 16, 2013

(54) METHOD AND DEVICE FOR COMPENSATION OF MECHANICAL STRESSES IN AN AIRCRAFT STRUCTURE

(75) Inventor: Thomas Grauerholz, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 349 days.

(21) Appl. No.: 12/077,122

(22) Filed: Mar. 17, 2008

(65) Prior Publication Data

US 2009/0234516 A1 Sep. 17, 2009

(51) Int. Cl.
*G06F 17/00* (2006.01)

(52) U.S. Cl.
USPC .................. 701/3; 73/760; 73/787

(58) Field of Classification Search
USPC .................. 701/3, 14, 31.7, 124; 340/539.1, 340/679, 529, 505, 517; 244/219, 99.8, 210, 244/195, 213, 49, 76 R, 90 R, 99.11; 702/56, 702/39, 184; 73/810–812, 808, 799, 577, 73/583, 764, 787, 802, 760, 765
See application file for complete search history.

(56) References Cited

U.S. PATENT DOCUMENTS

| | | | | |
|---|---|---|---|---|
| 5,182,449 A | * | 1/1993 | Johnson et al. | 250/227.14 |
| 5,774,376 A | * | 6/1998 | Manning | 702/56 |
| 5,806,805 A | * | 9/1998 | Elbert et al. | 244/195 |
| 5,881,971 A | * | 3/1999 | Hickman | 244/1 R |
| 6,134,485 A | * | 10/2000 | Tanielian et al. | 701/14 |
| 7,328,625 B2 | * | 2/2008 | Sundermeyer et al. | 73/806 |
| 7,379,845 B2 | * | 5/2008 | Gorinevsky et al. | 702/184 |
| 7,705,725 B2 | * | 4/2010 | Matsen et al. | 340/529 |
| 7,889,840 B2 | * | 2/2011 | Vasudevan et al. | 378/58 |
| 7,891,247 B2 | * | 2/2011 | Ihn | 73/602 |
| 7,917,311 B2 | * | 3/2011 | Finkel et al. | 702/39 |
| 2006/0126608 A1 | * | 6/2006 | Pereira et al. | 370/360 |
| 2006/0144997 A1 | * | 7/2006 | Schmidt et al. | 244/100 R |
| 2008/0036617 A1 | * | 2/2008 | Arms et al. | 340/679 |
| 2009/0084908 A1 | * | 4/2009 | Wildschek et al. | 244/76 R |
| 2010/0006708 A1 | * | 1/2010 | Law | 244/219 |
| 2010/0100338 A1 | * | 4/2010 | Vik et al. | 702/42 |
| 2010/0164711 A1 | * | 7/2010 | Arms et al. | 340/539.1 |

\* cited by examiner

*Primary Examiner* — Marthe Marc-Coleman
(74) *Attorney, Agent, or Firm* — Greer, Burns & Crain Ltd.

(57) ABSTRACT

A method and a device are described for compensation of mechanical stresses in an aircraft structure. The method comprises the steps of producing signals that represent mechanical stresses occurring in the aircraft structure, and operating actuators, which absorb at least some of the mechanical stresses and are arranged in the aircraft structure, such that the mechanical stresses are compensated.

11 Claims, 1 Drawing Sheet

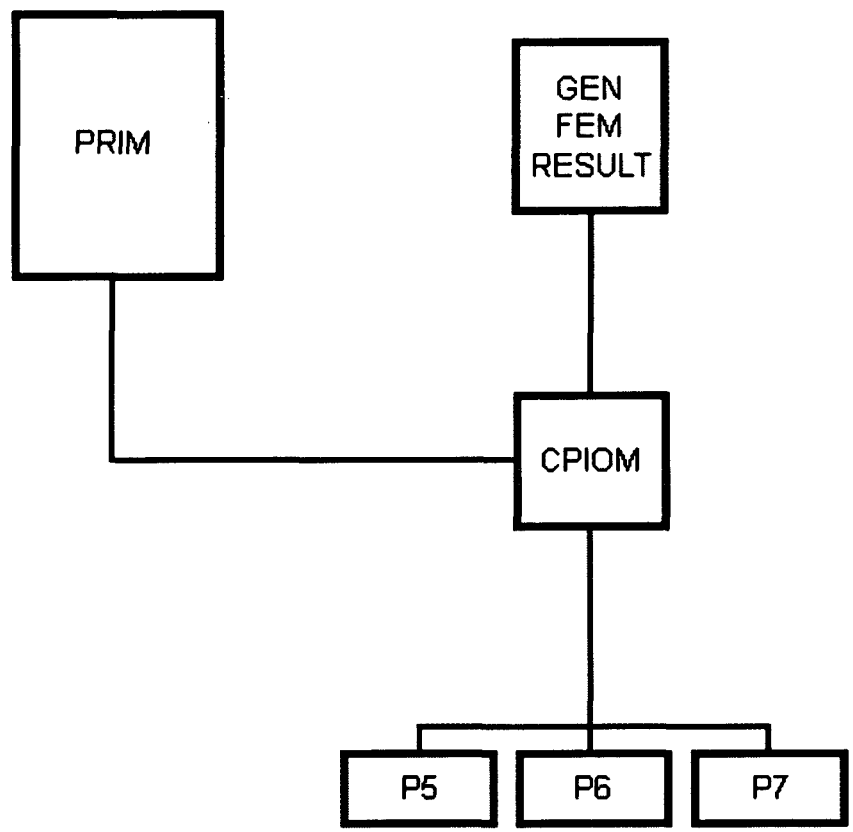

METHOD AND DEVICE FOR COMPENSATION OF MECHANICAL STRESSES IN AN AIRCRAFT STRUCTURE

FIELD OF THE INVENTION

The invention relates to a method and a device for compensation of mechanical stresses in an aircraft structure.

BACKGROUND OF THE INVENTION

The flight state and maneuvers can cause major loads in the structure in aircraft. In order to prevent damage to the structure, it must be designed to be sufficiently strong at appropriate points, and this contributes considerably to the weight of the aircraft. For example, braking in the final phase of the landing process leads to considerable stresses in the upper area of the shell of the aircraft fuselage, and this can even lead to the formation of battering in this area.

SUMMARY OF THE INVENTION

An object of the invention is to provide a method and a device for compensation of mechanical stresses in an aircraft structure by means of which damaging stress peaks are avoided.

Accordingly, a method for compensation of mechanical stresses in an aircraft structure is provided. In this method, the signals which represent the mechanical stresses which occur in the aircraft structure are produced, and actuators, which absorb (that is, receive or take up) at least some of the mechanical stresses and are arranged in the aircraft structure, are operated in the sense of compensation of mechanical stresses.

According to one embodiment of the method according to the invention, the signals which represent the mechanical stresses are derived from sensors.

According to one embodiment of the method according to the invention, the signals which represent the mechanical stresses are derived from flight state data and/or maneuver data.

According to one embodiment of the method according to the invention, the signals which represent the mechanical stresses are derived by means of an electronic computation device from the flight state data and/or maneuver data and from data which represents load states which occur in the aircraft structure as a function of the flight state and/or maneuvers.

According to one embodiment of the method according to the invention, the flight state data and/or maneuver data are/is derived from a primary flight computer, and the data which represents load states which occur in the aircraft structure as a function of the flight state and/or maneuvers is derived from a database which is coupled to the electronic computation device.

In this case, it is possible to provide for the database which is coupled to the electronic computation device to contain data obtained from a finite element load model.

According to one embodiment of the method according to the invention, actuators formed by piezoelectric elements are operated in order to compensate the mechanical stresses.

According to one embodiment of the method according to the invention, actuators which are arranged on frames, spars, longerons or stringers in the aircraft structure can be operated in order to compensate the mechanical stresses.

Furthermore, the invention provides a device for compensation of mechanical stresses in an aircraft structure. According to the invention, the device is adapted to produce signals which represent mechanical stresses which occur in the aircraft structure, and contains actuators, which are arranged in the aircraft structure and absorb at least some of the mechanical stresses, in order to compensate the mechanical stresses.

According to one embodiment of the invention, the device contains sensors for producing the signals which represent the mechanical stresses.

According to one embodiment of the invention, the device is adapted to derive signals which represent the mechanical stresses from flight state data and/or maneuver data.

According to one embodiment of the invention, the device contains an electronic computation device for derivation of the signals which represent the mechanical stresses from the flight state data and/or maneuver data, and from data which represents load states which occur in the aircraft structure as a function of the flight state and/or maneuvers.

According to one embodiment of the invention, the device contains a database which is coupled to the electronic computation device and in which data which represents load states which occur as a function of the flight state and/or maneuvers is provided, and is adapted to derive the flight state data and/or maneuver data from a primary flight computer, and to derive the data which represents load states which occur in the aircraft structure as a function of the flight state and/or maneuvers from the database which is coupled to the electronic computation device. In this case, it is possible to provide for the database which is coupled to the electronic computation device to contain data obtained from a finite element load model.

According to one embodiment of the invention, actuators formed by piezoelectric elements are provided in order to compensate the mechanical stresses.

According to one embodiment of the invention, actuators which are arranged on frames, spars, longerons or stringers in the aircraft structure are provided in order to compensate the mechanical stresses.

The actuators may comprise piezoelectric elements which are adhesively bonded to the frames, spars, longerons or stringers.

One advantage of the invention is that the loads which occur in the aircraft structure can be coped with better, thus allowing weight to be saved.

One exemplary embodiment of the invention will be explained in the following text with reference to the drawing.

BRIEF DESCRIPTION OF THE DRAWINGS

The (single) FIGURE shows a block diagram illustrating the major components and method steps of the invention, according to one exemplary embodiment.

DETAILED DESCRIPTION OF THE INVENTION

The device for compensation of mechanical stresses in an aircraft structure illustrated in the FIGURE is configured to produce signals which represent mechanical stresses which occur in the aircraft structure and contains actuators P5, P6, P7, which absorb at least some of the mechanical stresses and are arranged in the aircraft structure, in order to compensate for mechanical stresses. In the illustrated exemplary embodiment, the signals which represent the mechanical stresses are derived from flight state data and/or maneuver data.

The device comprises an electronic computation device CPIOM (Central Processor and Input and Output Memory) and a database GEN FEM RESULT which is coupled to it and contains data which represents load states which occur as a function of the flight state and/or maneuvers. The data contained in the GEN FEM RESULT database is obtained from a finite element load model (FEM-LC).

The flight state data and/or maneuver data are/is read from a primary flight computer PRIM, which is already provided in the aircraft, by the electronic computation device CPIOM, and the data which represents load states which occur in the aircraft structure as a function of the flight state and/or maneuvers is derived as a function of this from the GEN FEM RESULT database which is coupled to the electronic computation device CPIOM. Alternatively or additionally, the device may contain sensors for producing the signals which represent the mechanical stresses.

In the illustrated exemplary embodiment, actuators P5, P6, P7 which are formed by piezoelectric elements are provided in order to compensate the mechanical stresses. These actuators are arranged on frames, spars, longerons or stringers in the aircraft structure. The actuators P5, P6, P7 may be adhesively bonded to frames, spars, longerons or stringers.

In the method for compensation of mechanical stresses in aircraft structures, the signals which represent mechanical stresses which occur in the aircraft structure are produced, and the actuators P5, P6, P7, which absorb at least some of the mechanical stresses and are arranged in the aircraft structure, are operated in the sense of compensation of mechanical stresses. The actuators P5, P6, P7 absorb at least some of the mechanical stresses. The flight state data and/or maneuver data derived from the primary flight computer PRIM is processed together with the data which is derived from the GEN FEM RESULT database and represents the load states which occur in the aircraft structure as a function of the flight state and/or maneuvers by the electronic computation device CPIOM, in order to produce appropriate control signals for operating the actuators P5, P6, P7, which are formed by the piezoelectric elements, in the sense of at least partial compensation for the mechanical stresses.

In the described exemplary embodiment, the actuators P5, P6, P7 are formed by piezoelectric elements, although the actuators P5, P6, P7 could, however, also be formed by other types of actuators, instead of piezoelectric elements.

In the described exemplary embodiment, the GEN FEM RESULT database which is coupled to the electronic computation device CPIOM contains data obtained from a finite element load model FEM-LC, although the data could also be obtained by other methods, instead of this.

The actuators P5, P6, P7, of which only three are illustrated by way of example in this exemplary embodiment, are, however, in practice typically provided in a considerably greater number and are in each case arranged at different locations on the aircraft structure, each being controlled individually or in groups by the electronic computation device CPIOM in order to operate them in the sense of compensation of mechanical stresses.

What is claimed is:

1. A method for compensation of mechanical stresses in an aircraft structure, comprising the steps of:
    producing signals that represent mechanical stresses occurring in the aircraft structure, and
    operating actuators, which absorb at least some of the mechanical stresses and are arranged in the aircraft structure, such that the mechanical stresses are compensated,
    wherein the signals that represent the mechanical stresses are derived from at least one of central processor, input-output memory, sensors, flight state data, maneuver data, and by means of an electronic computation device from the flight state data and maneuver data and from data that represents load states which occur in the aircraft structure as a function of at least one of the flight stat and maneuvers, and
    wherein said flight state data and maneuver data are derived from a primary flight computer.

2. The method according to claim 1, wherein the data that represents load states which occur in the aircraft structure as a function of the flight state and maneuvers is derived from a database which is coupled to the electronic computation device.

3. The method according to claim 2, wherein the database which is coupled to the electronic computation device contains data obtained from a finite element load model.

4. The method according to claim 1, wherein actuators formed by piezoelectric elements are operated in order to compensate the mechanical stresses.

5. The method according to claim 1, wherein actuators which are arranged on at least one of frames, spars, longerons and stringers in the aircraft structure are operated in order to compensate the mechanical stresses.

6. A device for compensating of mechanical stresses in on the aircraft structure, comprising:
    actuators, which are arranged in the aircraft structure and absorb at least some of the mechanical stresses, in order to compensate the mechanical stresses,
    wherein the device is adapted to produce signals representing mechanical stresses which occur in the aircraft structure producing signals that represent mechanical stresses occurring in the aircraft structure, and
    wherein the signals that represent the mechanical stresses are derived from at least one of central processor, input-output memory, sensors, flight state data, maneuver data, and by means of an electronic computation device for derivation of the signals which represent the mechanical stresses from the flight state data and maneuver data, and from data which respresents load states which occur in the aircraft structure as a function of at least one of the flight state and maneuvers, and
    wherein the flight state data and maneuver data are derived from a primary flight computer.

7. The device according to claim 6, wherein the device contains a database which is coupled to the electronic computation device, and in which data which represents load states which occur as a function of the flight state and maneuvers is provided, and to derive the data which represents load states which occur in the aircraft structure as a function of the flight state and maneuvers from the database which is coupled to the electronic computation device.

8. The device according to claim 7, wherein the database which is coupled to the electronic computation device contains data obtained from a finite element load model.

9. The device according to claim 6, wherein the actuators comprise piezoelectric elements.

10. The device according to claim 9, wherein the actuators comprise piezoelectric elements which are adhesively bonded to said at least one of frames, spars, longerons and stringers.

11. The device according to claim 6, wherein the actuators are arranged on at least one of frames, spars, longerons and stringers in the aircraft structure, in order to compensate the mechanical stresses.

* * * * *